United States Patent [19]

Long et al.

[11] Patent Number: 5,232,056
[45] Date of Patent: Aug. 3, 1993

[54] AGRICULTURAL DRAWBAR AND SELF-LOCKING BUSHING THEREFOR

[75] Inventors: John D. Long, Ankeny; John O. Nieting, Johnston, both of Iowa

[73] Assignee: Deere & Company, Moline, Ill.

[21] Appl. No.: 795,593

[22] Filed: Nov. 21, 1991

[51] Int. Cl.⁵ ............................................. A01B 63/14
[52] U.S. Cl. .................................. 172/763; 172/624; 411/546; 411/957; 384/296
[58] Field of Search .................... 172/624, 624.5, 763, 172/776, 747; 403/158, 162, 380; 411/160–164, 546, 957, 959; 384/295, 296, 906, 276, 910; 29/898.054, 898.07, 521

[56] References Cited

U.S. PATENT DOCUMENTS

| | | | |
|---|---|---|---|
| 625,529 | 5/1899 | Andress | 403/380 X |
| 1,911,440 | 5/1933 | Desoutter | 411/959 X |
| 2,271,732 | 2/1942 | Chappuis | 411/957 X |
| 2,778,399 | 1/1957 | Mroz | 411/957 X |
| 3,124,370 | 3/1964 | Traugott | 411/957 X |
| 3,770,332 | 11/1973 | Dunn | 384/276 |
| 4,759,301 | 7/1988 | Thomas | 111/926 X |

OTHER PUBLICATIONS

"John Deere 7100 Mounted Max-Emerge Planter" Owner's Manual, 1982 pp. 128–131.

*Primary Examiner*—David H. Corbin
*Assistant Examiner*—Spencer Warnick

[57] ABSTRACT

A drawbar assembly includes a self-locking bushing which is supported from the drawbar mounting bracket by a conventional nut and bolt fastener. Each end of the bushing includes radial line projections which bite into the mounting bracket and into a washer interposed between the nut and the bushing when the nut is threaded onto the bolt. By capturing both bushing ends, the bushing cannot rotate to loosen the nut or wear against the mounting bracket and washer. The bushing is formed as a single component with the radial line projections by a powdered metal process and hardened to provide wear resistance. Dissimilar metals in the bushing and the drawbar at the pivotal connection reduce wear.

10 Claims, 3 Drawing Sheets

AGRICULTURAL DRAWBAR AND SELF-LOCKING BUSHING THEREFOR

BACKGROUND OF THE INVENTION

1. Field of the Invention

The present invention relates generally to agricultural implements with a drawbar pivotally mounted on a frame by a bracket and bushing assembly.

2. Related Art

Implements such as a grain drill typically include an opener assembly having a pair of drawbars with forward apertured ends pivotally connected to a frame-mounted bracket and aft ends supporting a furrow-forming device such as a disk opener. Each of the forward ends of the drawbars is attached to the mounting bracket by a bolt that extends through the bracket and through a hard bushing; a washer and locknut secure the bushing against the side of the bracket and maintain the apertured end of the drawbar on the bushing.

During normal field-working operations, the pivotal area wears and loosens as high loads and vibration are encountered. The forward end of the drawbar often binds against the washer causing the washer to rotate on the bolt which in turn results in loosening of the nut. The bushings at times will rotate and friction between the bushing end and the bracket causes wear that results in more play in the connection. As the pivotal connections loosen with wear and nut rotation, the opener assemblies tend to wobble and vibrate and do not trail as well as they should.

Various methods, including the use of more expensive high grade bolts and higher tightening torques, have reduced the loosening problem somewhat. However, the nuts still loosen and the bushings wear prematurely, both axially with bushing rotation and circumferentially as the drawbars pivot.

BRIEF SUMMARY OF THE INVENTION

It is therefore an object of the present invention to provide an improved drawbar arrangement for an agricultural implement such as grain drill. It is a further object to provide such an arrangement which overcomes the aforementioned problems.

It is another object of the present invention to provide an improved drawbar arrangement for an implement such as a grain drill which has better wear life and which remains tighter in the pivotal area with use than at least most previously available drawbar arrangements. It is still another object to provide such an arrangement which is relatively simple and inexpensive in construction.

It is yet another object of the invention to advantageously utilize dissimilar materials in the journal area of an agricultural drawbar to lessen wear, improve the wear life and maintain a firmer connection over time. It is another object to provide an improved drawbar journal area without the added expense of high grade bolts or special cutting, grinding or machining of parts.

A drawbar assembly constructed in accordance with the teachings of the present invention includes a self-locking bushing which is supported from the drawbar mounting bracket by a conventional nut and bolt fastener. Each end of the bushing includes radial line projections which bite into the mounting bracket and into a washer interposed between the nut and the bushing when the nut is tightened on the bolt. The area of the projections is made relatively small compared to the area of the end face of the bushing so that the bolt tightening torque necessary to cause the projections to bite into the adjacent metal components is reduced. By capturing both bushing ends, the bushing cannot rotate to loosen the nut or wear against the mounting bracket and washer, and problems with loosening are substantially reduced over conventional arrangements. As a result, better wear life and a more secure and stable pivotal connection are obtained.

The bushing is formed with the radial line projections by a powdered metal process and hardened to provide wear resistance. The single piece bushing construction is relatively simple and inexpensive, and the need for high grade bolts or special cutting, grinding or machining of parts is eliminated. The metal in the bushing is of different composition than the metal in the drawbar to reduce friction, increase wear life and maintain a good connection that does not vibrate or promote wobble and vibration in the drawbar.

These and other objects, features and advantages of the present invention will become apparent to one skilled in the art upon reading the following detailed description in view of the drawings.

DETAILED DESCRIPTION OF THE DRAWINGS

Figure 1:
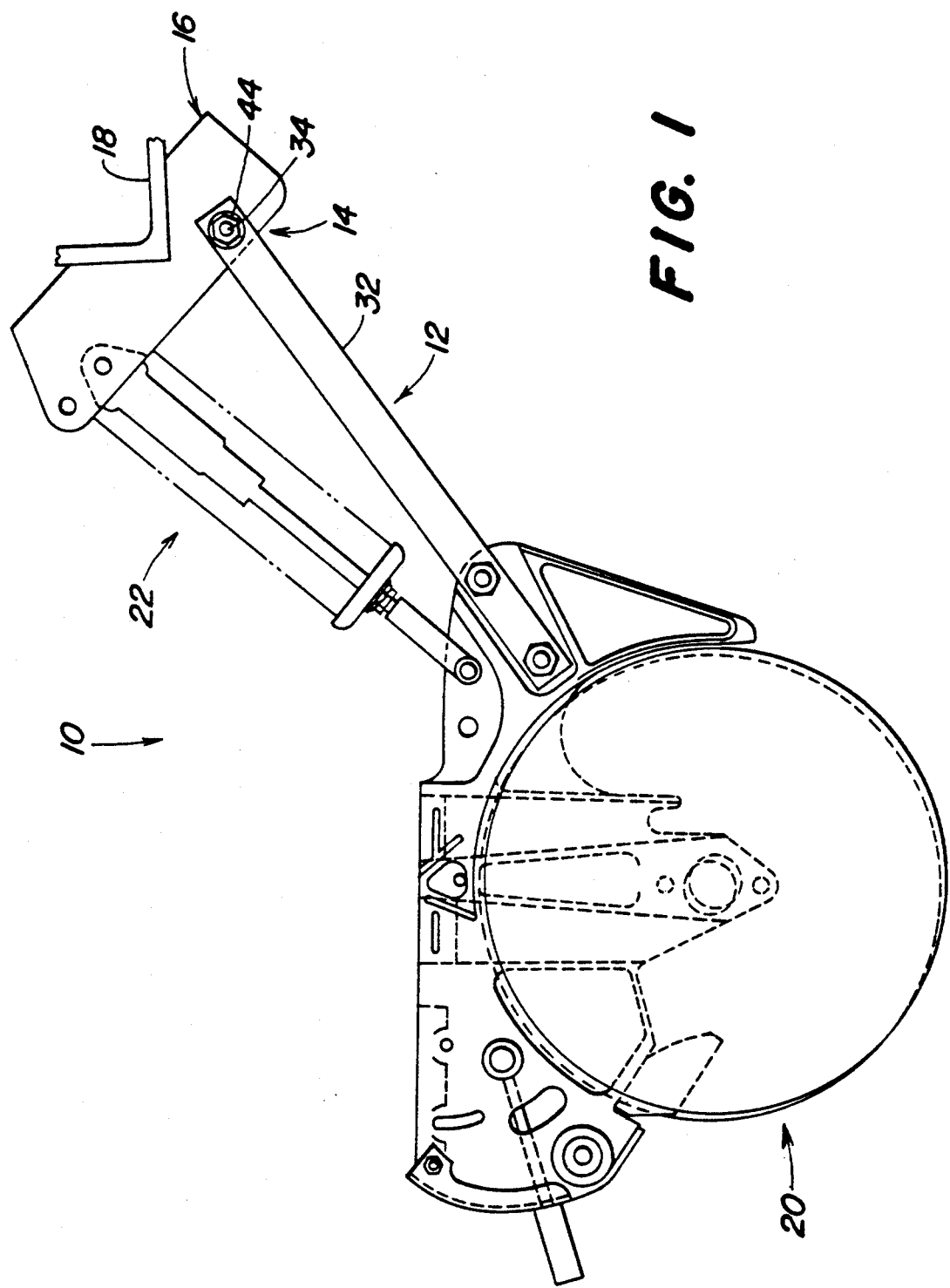
FIG. 1 is a side view of an opener assembly with a drawbar assembly pivotally connected to a mounting bracket.

Referring now to FIG. 1, therein is shown an opener assembly 10 including a drawbar assembly 12 having forward ends pivotally connected at 14 to a mounting bracket 16. The bracket 16 is supported from a transversely extending beam 18 which forms part of a frame on an agricultural implement. The aft ends of the drawbar assembly 12 support an earthworking tool 20 such as a disk opener assembly or other ground engaging tool. The tool is maintained in soil contact by a down pressure spring assembly 22 connected between the bracket 16 and the tool. A plurality of the opener assemblies 10 are transversely spaced along the beam 18, and relatively tight connection is necessary at 14 for proper tracking of the tool 20 and relatively vibration-free transport.

Figure 2:
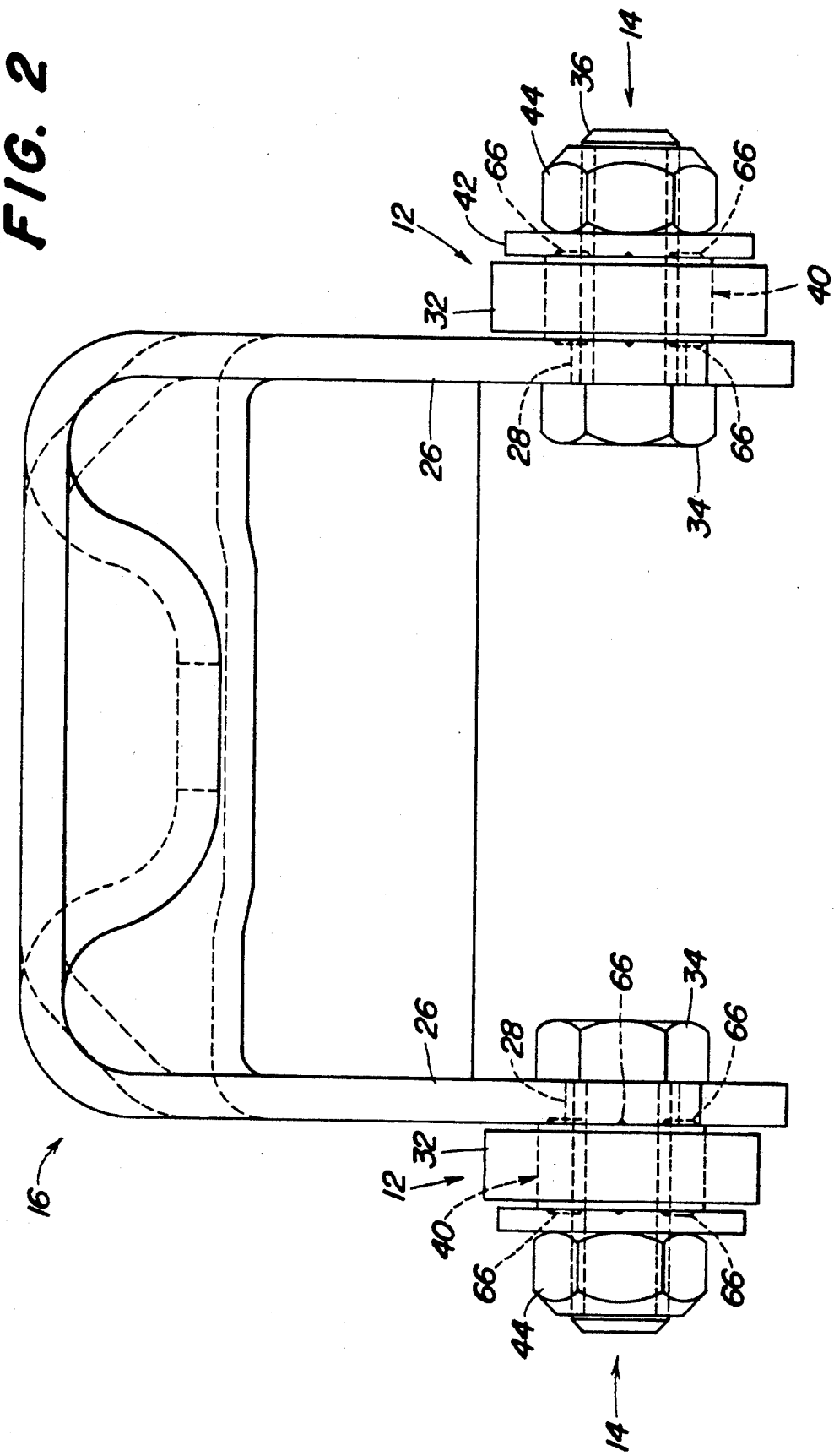
FIG. 2 is an enlarged view of the drawbar assembly pivotal mounting of FIG. 1.

As best seen in FIGS. 1 and 2, the mounting bracket 16 is channel-shaped and opens rearwardly to define a pair of transversely spaced mounting flanges 26 which are apertured at locations 28. The drawbar assembly 12 of FIGS. 1 and 2 includes a pair of drawbars 32 which are connected at the aperture locations 28 by pin structures 34 and converge in the rearward direction to a connection with the tool 20. The pivotal connections at areas 14 are generally mirror images of each other, and therefore only one of the areas will be described in detail.

The pin structure 34 is shown as a conventional bolt with a threaded end 36 extending through the bracket aperture 28. A bushing 40 is carried by the shank of the bolt 34 between the flange 26 and a washer 42. The forward end of the drawbar 32 is apertured for receipt over the bushing 40. A nut 42 threaded onto the end 36 sandwiches the bushing 40 between the side of the flange 26 and the washer 42 and retains the drawbar 32 on the bushing.

Figure 4:
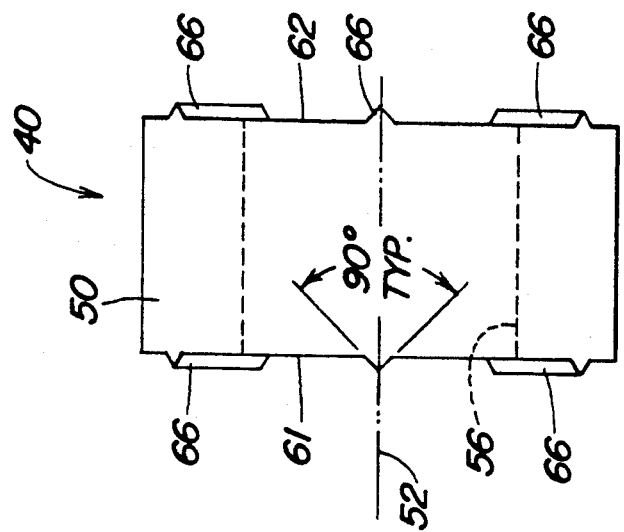
FIG. 4 is a front view of the bushing of FIG. 3.
Figure 3:
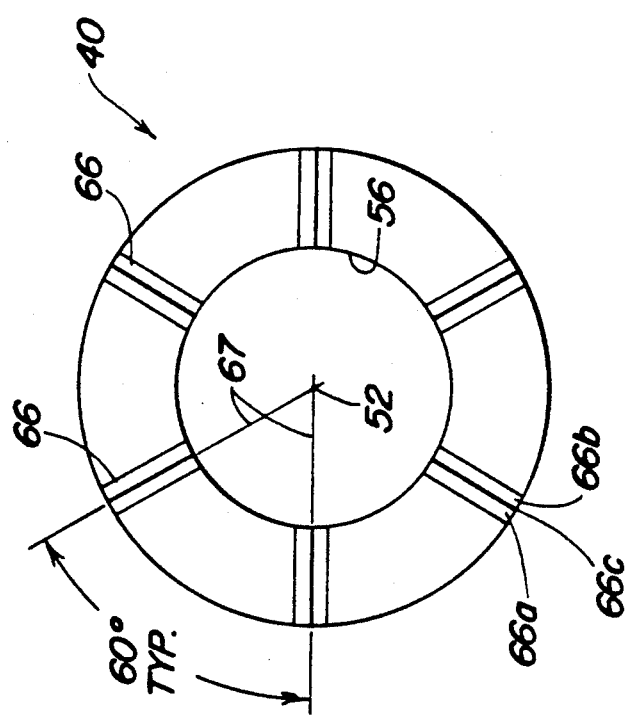
FIG. 3 is an end view of the bushing utilized in the pivot.

The bushing 40, fabricated as a unitary component using a powdered metal process, includes a cylindrical body 50 (FIGS. 3 and 4) having a cylinder axis 52. The body has a central aperture 56 with diameter approximately equal to but slightly larger than the diameter of the bolt shank. The body 50 also includes opposite ends 61 and 62, a substantial portion of each end being planar and lying in a plane which is perpendicular to the cylinder axis 52.

Each of the ends 61 and 62 includes axial ribs or projections 66 lying generally along lines 67 (FIG. 3) which extend radially from the cylinder axis 52. As shown, six projections 66 spaced at intervals of 60° are located on each of the ends 61 and 62. Each projection 66 includes opposite planar sides 66a and 66b which lie at angles of 135° with respect to the plane of bushing end to form an angle of 90° at the apex (66c) of each projection. The apex 66c lies on the radial line 67 and is offset a relatively small distance, preferably between 0.05 and 0.01 inch and ideally around 0.02 inch, from the plane of the corresponding end. The area of the projections 66 forms only a relatively small fraction, preferably substantially less than about twenty-five percent, of the end surface area so that the tightening torque on the nut 44 which is necessary for the projections to bite into the adjacent metal is minimized.

As the nut 44 is tightened on the bolt 34 (FIG. 2), the projections 66 on one side of the bushing 40 engage and bite into the surface of the flange 26 while the opposite end projections 66 bite into the surface of the washer 42. The bushing 40 and washer 42 are therefore fixed against rotation relative to each other and to the flange 26, and sliding of the bushing 40 relative to the flange 26 and the washer 42 is prevented. The drawbar 32 is free to pivot on the bushing 40 without binding or loosening of the nut 44.

To reduce friction and wear, the bushing 40 and the drawbar 32 are fabricated from dissimilar metals. The link, for example, is a medium carbon steel (such as SAE 1045) and the bushing is a nickel alloy of minimum apparent hardness Rc 20 (such as MPIF modified FL4608 with addition of 2% Cu, 1% C).

Having described the preferred embodiment, it will become apparent that various modifications can be made without departing from the scope of the invention as defined in the accompanying claims.

We claim:

1. In an agricultural implement having a frame adapted for forward movement over the soil, and an opener assembly including a fore-and-aft extending drawbar having a forward mounting portion and a tool connected to the aft end of the drawbar for trailing the frame, a drawbar assembly comprising:
   a bracket connected to the frame,
   a pivotal connection including pin means for supporting the forward mounting portion of the drawbar from the bracket, the pivotal connection further including a cylindrically shaped unitary bushing supported on the pin means and pivotally supporting the forward mounting portion, the bushing including projections extending axially from one end;
   means for urging said one end of the bushing against the mounting bracket so that the projections bite into the bracket to prevent rotation of the bushing; and
   wherein the end of the bushing opposite said one end includes second projections and wherein the means for urging includes a washer supported over the pin means adjacent the second projections, the means for urging further comprising a nut threaded onto the pin means for sandwiching the bushing between the washer and the mounting bracket with the second projections biting into the washer to thereby prevent rotation of the washer relative to the bushing as the drawbar rocks on the bushing.

2. The invention as set forth in claim 1 wherein the ends include substantially planar portions, and wherein the area of the projections is substantially less than the area of the planar portions.

3. The invention as set forth in claim 1 wherein the forward mounting portion and the bushing are fabricated from dissimilar materials to decrease friction.

4. The invention as set forth in claim 1 wherein the bushing is fabricated from powdered metal.

5. The invention as set forth in claim 1 wherein the projections comprise radial line projections which extend radially outwardly along lines which project radially from the center of the bushing.

6. An assembly for an agricultural drawbar with a forward mounting portion fabricated from metal and with a tool-supporting aft end, the assembly adapted for connection to a mounting bracket, the assembly comprising:
   a bushing, a nut, bolt and washer, wherein the bushing is sandwiched between the washer and the mounting bracket by the nut, and the bushing includes;
   a cylindrical body portion of unitary construction having an outer cylindrical surface and a cylinder axis, the body fabricated from metal and having a central aperture adapted for receipt on the bolt, the cylindrical surface adapted for engagement with and pivotal support of the forward mounting portion;
   opposite ends having substantially flat portions with axial projections extending outwardly in the direction of the cylinder axis from the flat portions, the projections adapted for biting into the washer and mounting bracket as the nut is tightened on the bolt; and
   wherein the area of the flat portions is substantially greater than the area of the projections to facilitate the biting into the washer and mounting bracket by the projections.

7. The invention as set forth in claim 6 wherein the projections generally lie along lines which extend radially from the cylinder axis.

8. The invention as set forth in claim 6 wherein the projections include apexes which are offset from the flat portions by less than approximately 0.05 inch.

9. The invention as set forth in claim 8 wherein each of the ends has no more than approximately six projections, the area of the projections being substantially less than twenty-five percent of the total area of the end.

10. The invention as set forth in claim 6 wherein the bushing is fabricated from a powdered metal process.

* * * * *